United States Patent
Lee et al.

(10) Patent No.: US 10,261,359 B1
(45) Date of Patent: Apr. 16, 2019

(54) POLARIZER AND DISPLAY DEVICE INCLUDING THE SAME

(71) Applicant: Samsung Display Co., Ltd., Yongin-si, Gyeonggi-do (KR)

(72) Inventors: Seon Uk Lee, Seongnam-si (KR); Min Su Kim, Hwaseong-si (KR); Jae Cheol Park, Hwaseong-si (KR); Yeo Geon Yoon, Suwon-si (KR); You Young Jin, Suwon-si (KR); Wang Su Hong, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/958,384

(22) Filed: Apr. 20, 2018

(30) Foreign Application Priority Data

Nov. 13, 2017 (JP) .......................... 10-2017-0150477

(51) Int. Cl.
*G02F 1/1335* (2006.01)
*G02B 5/30* (2006.01)
*G02F 1/1337* (2006.01)

(52) U.S. Cl.
CPC ..... *G02F 1/133528* (2013.01); *G02B 5/3058* (2013.01); *G02F 1/1337* (2013.01); *G02F 1/133514* (2013.01); *G02F 2001/133548* (2013.01); *G02F 2201/121* (2013.01); *G02F 2201/123* (2013.01)

(58) Field of Classification Search
CPC ........................................... G02F 2001/133548
See application file for complete search history.

(56) References Cited

U.S. PATENT DOCUMENTS

| 6,288,840 | B1 | 9/2001 | Perkins et al. |
| 7,965,357 | B2 | 6/2011 | Van De Witte et al. |
| 8,525,958 | B2 | 9/2013 | Lee |
| 9,383,601 | B2 | 7/2016 | Lee et al. |
| 2017/0269427 | A1* | 9/2017 | Shin ..................... G02B 5/3058 |

FOREIGN PATENT DOCUMENTS

| JP | 2015-528581 A | 9/2015 |
| KR | 10-2007-0105092 A | 10/2007 |
| KR | 10-2008-0004880 A | 1/2008 |
| KR | 10-2008-0056582 A | 6/2008 |
| KR | 10-2010-0011103 A | 2/2010 |
| KR | 10-2011-0113968 A | 10/2011 |
| KR | 10-2012-0025407 A | 3/2012 |
| KR | 10-1270200 B1 | 5/2013 |
| WO | 2010005059 A1 | 1/2012 |

* cited by examiner

*Primary Examiner* — Phu Vu
(74) *Attorney, Agent, or Firm* — Innovation Counsel LLP

(57) ABSTRACT

Provided are a polarizer and a display device including a polarizer. The polarizer comprises: a base; a wire grid pattern layer disposed on the base and including wire patterns extending in a first direction and spaced apart from each other in a second direction intersecting the first direction; and a capping layer which is disposed on the wire grid pattern layer and comprises a first inorganic capping layer containing an inorganic material and an organic capping layer containing an organic material, wherein the first inorganic capping layer comprises inorganic capping patterns which are disposed on the wire grid pattern layer, extend in the first direction and are spaced apart from each other in the second direction and being disposed at positions corresponding to the wire patterns, and at least a portion of the organic capping layer is inserted into a space between adjacent inorganic capping patterns.

20 Claims, 12 Drawing Sheets

POLARIZER AND DISPLAY DEVICE INCLUDING THE SAME

This application claims priority from Korean Patent Application No. 10-2017-0150477, filed on Nov. 13, 2017, in the Korean Intellectual Property Office, and all the benefits accruing therefrom under 35 U.S.C. 119, the disclosure of which in its entirety is herein incorporated by reference.

BACKGROUND

1. Field

The present inventive concept relates to a polarizer and a display device including the same.

2. Description of the Related Art

A polarizer transmits a polarization component oscillating in a direction parallel to its transmission axis and partially blocks a polarization component oscillating in a direction intersecting the transmission axis. In so doing, the polarizer can convert unpolarized incident light into light having a specific polarization state. When the polarizer having such a polarization capability is applied to a display device, the display device can have various optical functions.

For example, in a liquid crystal display, the polarizer may perform a shutter function together with a liquid crystal layer to control the amount of light (provided from a light source unit) transmitted. Accordingly, the amount of light transmitted through the liquid crystal layer in each pixel can be controlled to display an image.

An example of the polarizer is a wire grid pattern having a short pitch. When the pitch of the wire grid pattern is sufficiently shorter than the wavelength of incident light, the wire grid pattern can have a polarization capability.

SUMMARY

In order to provide a wire grid pattern having excellent polarization performance, the width of wire patterns of the wire grid pattern and the distance between adjacent wire patterns should be very finely adjusted. However, as the pitch of the wire grid pattern becomes fine, the process becomes complicated, and a defect can occur due to the fine wire grid pattern in a process subsequent to the formation of the wire grid pattern. The defect caused by the wire grid pattern not only degrade the polarization performance of the polarizer but also deteriorate the display quality of a display device including the polarizer.

Aspects of the inventive concept provide a polarizer having excellent polarization performance without defects.

Aspects of the inventive concept also provide a display device having excellent display quality by including the polarizer.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an exemplary embodiment of the invention, there is provided a polarizer. The polarizer comprises: a base; a wire grid pattern layer which is disposed on the base and the wire grid pattern layer comprises a plurality of wire patterns extending in a first direction and spaced apart from each other in a second direction intersecting the first direction; and a capping layer which is disposed on the wire grid pattern layer and comprises a first inorganic capping layer containing an inorganic material and an organic capping layer containing an organic material formed on the first inorganic capping layer, wherein the first inorganic capping layer comprises a plurality of inorganic capping patterns which are disposed on the wire grid pattern layer, extend in the first direction and are spaced apart from each other in the second direction where the inorganic capping patterns are disposed at positions corresponding to the wire patterns, and at least a portion of the organic capping layer is inserted into a space between adjacent inorganic capping patterns.

In an exemplary embodiment, the wire patterns of the wire grid pattern layer have a first width in the second direction and the inorganic capping patterns have a second width in the second direction, the second width being greater than the first width.

In an exemplary embodiment, the polarizer may further comprise a second inorganic capping layer which is disposed on the organic capping layer and contains an inorganic material, wherein a thickness of the second inorganic capping layer may be substantially uniform.

In an exemplary embodiment, a distance between the adjacent inorganic capping patterns may be about 15 nanometers (nm) to about 50 nm and may be smaller than a distance between the wire patterns.

In an exemplary embodiment, a thickness of the inorganic capping patterns may be about 800 Å to about 1,500 Å.

In an exemplary embodiment, the inorganic capping patterns may be partially in contact with side surfaces of the wire patterns.

In an exemplary embodiment, the inorganic capping patterns may be partially in contact with the base.

In an exemplary embodiment, the inorganic capping patterns may be in contact with upper surfaces of the wire patterns, and the organic capping layer may be in contact with upper surfaces of the inorganic capping patterns.

In an exemplary embodiment, the organic capping layer may be partially in contact with side surfaces of the inorganic capping patterns.

In an exemplary embodiment, at least a portion of the organic capping layer may be inserted into a space between adjacent wire patterns.

In an exemplary embodiment, the organic capping layer may be partially in contact with the base.

In an exemplary embodiment, the wire patterns may comprise, first wire patterns which contain a metallic material, and second wire patterns which are disposed between the first wire patterns and the inorganic capping patterns and contain a non-metallic inorganic material, wherein a width of the first wire patterns may be greater than or equal to a width of the second wire patterns.

In an exemplary embodiment, a thickness of the first wire patterns may be greater than that of the second wire patterns.

In an exemplary embodiment, the inorganic capping patterns may be partially in contact with side surfaces of the first wire patterns and side surfaces of the second wire patterns.

In an exemplary embodiment, a void may be defined in a space surrounded by the base, adjacent wire patterns, and the inserted organic capping layer.

According to another exemplary embodiment of the invention, there is provided a polarizer. The polarizer comprises: a base; a wire grid pattern layer which is disposed on the base and the wire grid pattern layer comprises a plurality of wire patterns extending in a first direction and spaced apart from each other in a second direction intersecting the first direction; and a capping layer which is disposed on the wire grid pattern layer and comprises a first portion containing an inorganic material and a second portion containing an organic material, wherein the first portion and the second portion are arranged alternately along the second direction.

In an exemplary embodiment, the first portions may be disposed at positions corresponding to the wire patterns, and the second portions may be disposed at positions corresponding to spaces between adjacent wire patterns.

In an exemplary embodiment, a width of the first portions in the second direction may be greater than that of the second portions in the second direction.

According to an exemplary embodiment of the invention, there is provided a display device. The display device comprises: a first panel which comprises a polarizer; a second panel which faces the first panel; and a liquid crystal layer which is interposed between the first panel and the second panel, wherein the polarizer comprises: a wire grid pattern layer which comprises a plurality of wire patterns extending in a first direction and spaced apart from each other in a second direction intersecting the first direction; an inorganic capping layer which is disposed on the wire grid pattern layer and comprises a plurality of inorganic capping patterns extending in the first direction and spaced apart from each other in the second direction where the inorganic capping patterns are disposed at positions corresponding to the wire patterns; and an organic capping layer which is disposed on the inorganic capping layer, wherein at least a portion of the organic capping layer is inserted into a space between adjacent inorganic capping patterns.

In an exemplary embodiment, the first panel comprises, a first base substrate, a color conversion pattern layer which is disposed on a surface of the first base substrate, an inorganic protective layer which is disposed on the color conversion pattern layer and contains an inorganic material, the wire grid pattern layer which is disposed on the inorganic protective layer, the inorganic capping layer which is disposed on the wire grid pattern layer and made of a different material from the inorganic protective layer, the organic capping layer which is disposed on the inorganic capping layer, and a common electrode which is disposed on the organic capping layer, and the second panel comprises, a second base substrate, a switching element which is disposed on a surface of the second base substrate, and a pixel electrode which is disposed on the switching element.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
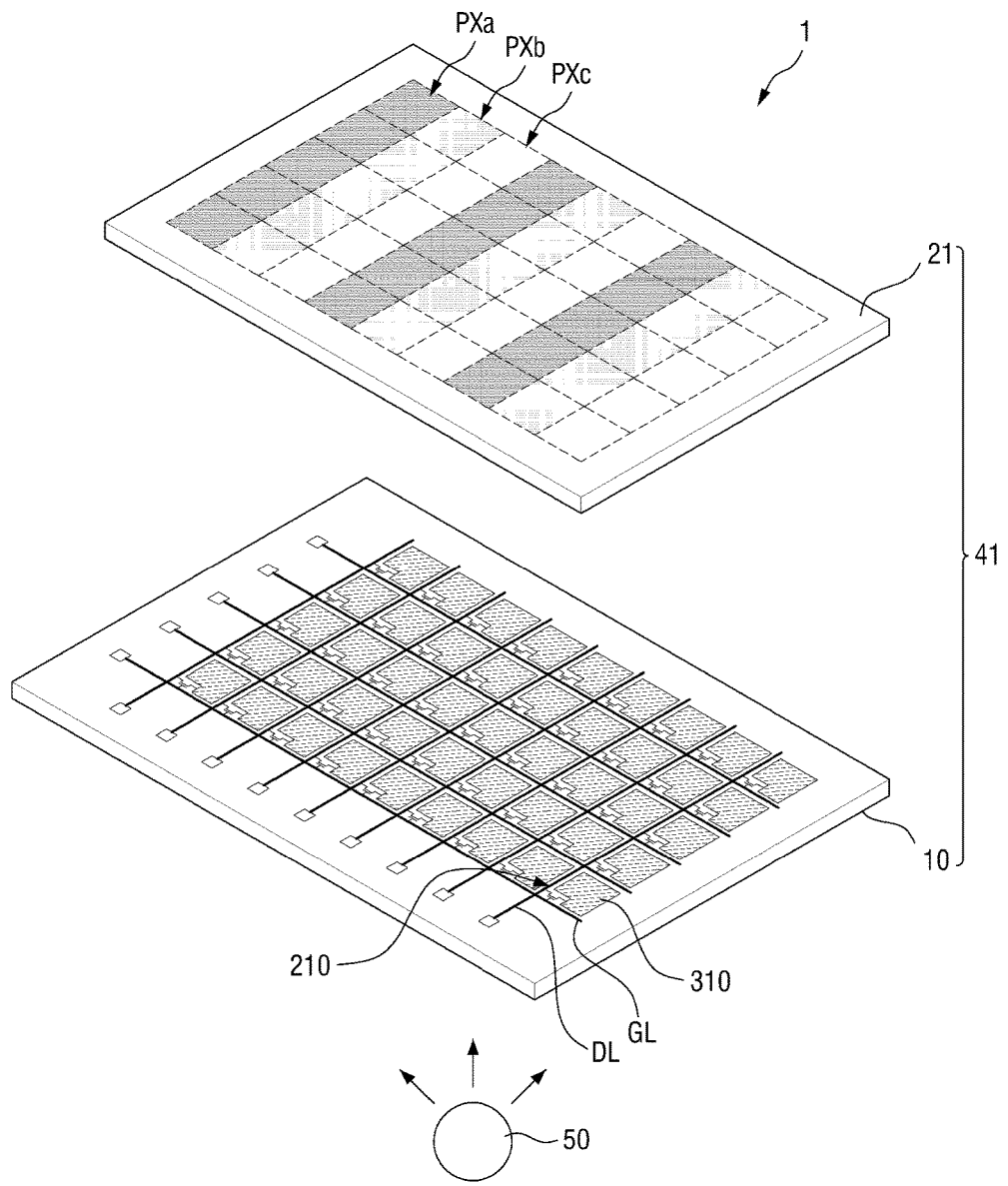
FIG. 1 is an exploded perspective view of a display device according to an embodiment.

Features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

It will be understood that when an element or layer is referred to as being "on," "connected to" or "coupled to" another element or layer, the element or layer can be directly on, connected or coupled to another element or layer or with intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, including "at least one," unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof. "At least one" is not to be construed as limiting "a" or "an." "Or" means "and/or."

As used herein, the term "and/or" includes any and all combinations of one or more of the associated listed items.

In the description that follows, a first direction X refers to an arbitrary direction on a plane, a second direction Y refers to a direction intersecting the first direction X on the plane, and a third direction Z refers to a direction perpendicular to the plane.

Hereinafter, embodiments will be described with reference to the accompanying drawings.

FIG. 1 is an exploded perspective view of a display device 1 according to an embodiment.

Referring to FIG. 1, the display device 1 according to the current embodiment includes a display panel 41 and a light source unit 50 which provides light to the display panel 41.

A plurality of pixels PXa through PXc arranged substantially in a matrix form in plan view may be defined in the display panel 41. As used herein, 'pixels' refer to single regions into which a display area is divided for color display in plan view, and one pixel may express a predetermined primary color. That is, one pixel may be a minimum unit of the display panel 41 which can express a color independently of other pixels.

The pixels PXa through PXc may include a first pixel PXa which displays a first color, a second pixel PXb which displays a second color having a longer peak wavelength than the first color, and a third pixel PXc which displays a third color having a longer peak wavelength than the second color. In one embodiment, the first pixel PXa, the second pixel PXb and the third pixel PXc may form a basic unit, and the basic unit may be repeated in a direction. Hereinafter, a case where the first color displayed by the first pixel PXa is a blue color having a peak wavelength in the range of about 430 nanometers (nm) to about 470 nm, the second color displayed by the second pixel PXb is a green color having a peak wavelength in the range of about 530 nm to about 570 nm, and the third color displayed by the third pixel PXc is a red color having a peak wavelength in the range of about 610 nm to about 650 nm will be described as an example.

The light source unit 50 may be disposed under the display panel 41 and emit light having a specific wavelength toward the display panel 41. The light source unit 50 may include a light source (not illustrated) which directly emits light and a light guide plate (not illustrated) which guides light received from the light source toward the display panel 41. The material of the light guide plate is not particularly limited as long as it is a material having high light transmittance. For example, the light guide plate may be made of a glass material, a quartz material, or a plastic material such as polyethylene terephthalate or polycarbonate.

The light source may be a light emitting diode (LED), an organic light emitting diode (OLED), or a laser diode (LD). In some embodiments, the light source may emit blue light having a single peak wavelength in the range of about 430 nm to about 470 nm. In another embodiment, the light source may emit light in an ultraviolet wavelength band or may emit white light that includes a blue wavelength band, a green wavelength band and a red wavelength band.

Although not illustrated in the drawing, one or more optical sheets (not illustrated) may be disposed between the display panel 41 and the light source unit 50. The optical sheets may include one or more of a prism sheet, a diffusion sheet, a (reflective) polarizing sheet, a lenticular lens sheet, and a micro-lens sheet. The optical sheets can improve the display quality of the display device 1 by modulating optical characteristics (e.g., condensing, diffusing, scattering, or polarization characteristics) of light travelling toward the display panel 41 after being emitted from the light source unit 50.

The display panel 41 will now be described in detail by additionally referring to FIG. 2.

Figure 2:
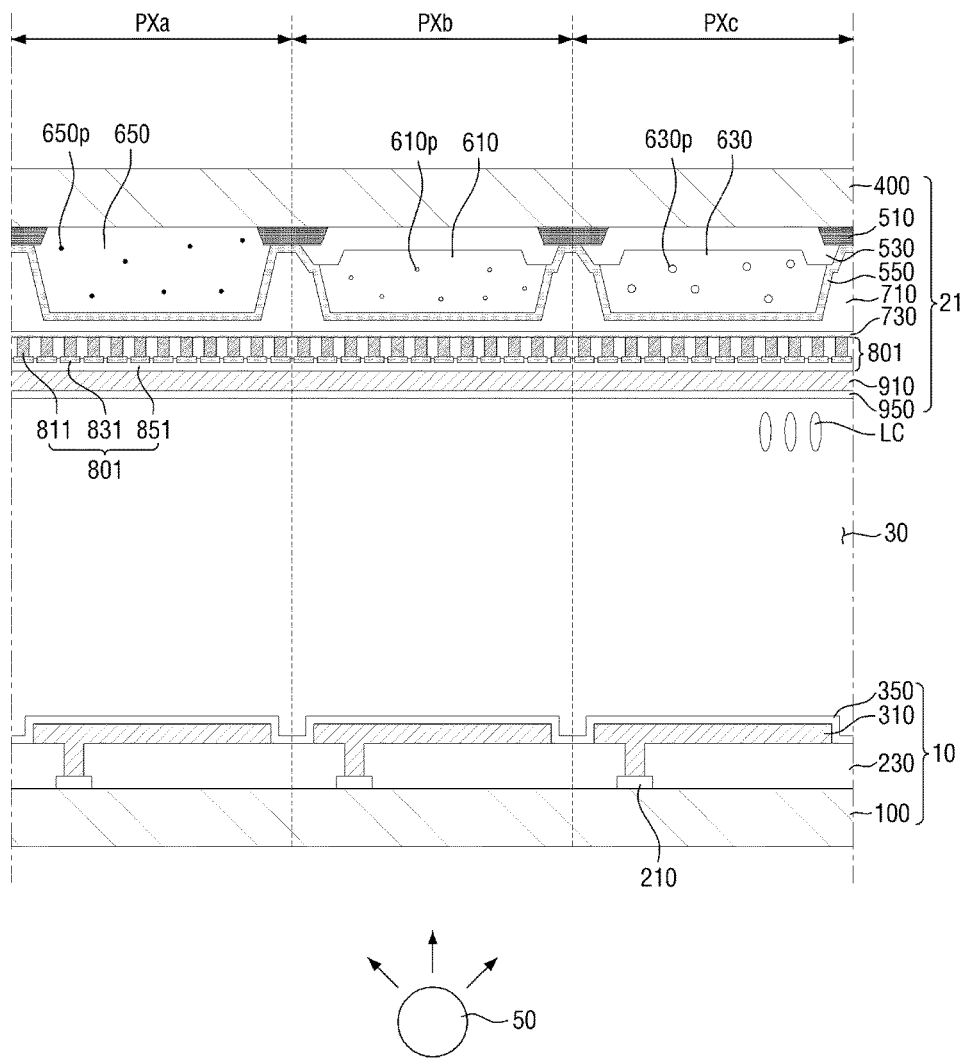
FIG. 2 is a cross-sectional view of arbitrary pixels of the display device of FIG. 1.

FIG. 2 is a cross-sectional view of arbitrary pixels of the display device 1 of FIG. 1, specifically, a cross-sectional view of the first pixel PXa, the second pixel PXb and the third pixel PXc.

Referring to FIGS. 1 and 2, the display panel 41 may include a lower panel 10, an upper panel 21 facing the lower panel 10, and a liquid crystal layer 30 interposed between the lower panel 10 and the upper panel 21. The liquid crystal layer 30 may be sealed by the lower panel 10, the upper panel 21, and a sealing member (not illustrated) for bonding the lower panel 10 and the upper panel 20 together.

First, the lower panel 10 will be described. The lower panel 10 may include a first base substrate 100, a plurality of switching elements 210, and a plurality of pixel electrodes 310.

The first base substrate 100 may be a transparent insulating substrate. For example, the first base substrate 100 may include a glass material, a quartz material, or a translucent plastic material. In some embodiments, the first base substrate 100 may be flexible, and the display device 1 may be a curved display device.

The switching elements 210 may be disposed on a surface (an upper surface in FIG. 2) of the first base substrate 100. The switching elements 210 may respectively be disposed in the pixels PXa through PXc to transmit driving signals to the pixel electrodes 310 or block the driving signals. In an embodiment, each of the switching elements 210 may be a thin-film transistor including a gate (not illustrated), an active layer (not illustrated) disposed on the gate, and a source (not illustrated) and a drain (not illustrated) disposed on the active layer to be separated from each other. A control terminal (e.g., the gate) of each of the switching elements 210 may be connected to a gate line GL to receive a gate driving signal, an input terminal (e.g., the drain) may be connected to a data line DL to receive a data driving signal, and an output terminal (e.g., the source) may be electrically connected to a pixel electrode 310. The active layer may include a silicon-based semiconductor material such as amorphous silicon, polycrystalline silicon or monocrystalline silicon or may include an oxide semiconductor material. The active layer may serve as a channel of each of the switching elements 210, and the channel may be turned on or off according to the voltage applied to the gate.

An intermediate layer 230 may be disposed on the switching elements 210. The intermediate layer 230 may insulate elements disposed on the intermediate layer 230 from elements disposed under the intermediate layer 230. In addition, the intermediate layer 230 may minimize a step difference between a plurality of elements stacked on the first base substrate 100. The intermediate layer 230 may include one or more layers. For example, the intermediate layer 230 may include an organic layer made of an organic material, an inorganic layer made of an inorganic material, or a stacked structure of an organic layer and an inorganic layer.

The pixel electrodes 310 may be disposed on the intermediate layer 230. Each of the pixel electrodes 310 may be a field generating electrode that forms an electric field in the liquid crystal layer 30 together with a common electrode 910 which will be described later.

The pixel electrodes 310 respectively disposed in the pixels PXa through PXc may be controlled independently, and different driving signals may be transmitted to the pixel electrodes 310. For example, the pixel electrodes 310 may be electrically connected to the output terminals of the switching elements 210 via contact holes formed in the intermediate layer 230, respectively. The electric field formed by each of the pixel electrodes 310 and the common electrode 910 can control the behavior of liquid crystals LC in a corresponding pixel and rearrange the liquid crystals LC. The pixel electrodes 310 may be made of a transparent conductive material. Examples of the transparent conductive material include indium tin oxide (ITO), indium zinc oxide (IZO), zinc oxide (ZnO), indium (III) oxide ($In_2O_3$), indium gallium oxide (IGO), and aluminum zinc oxide (AZO). Although not illustrated in the drawings, the pixel electrodes 310 can have fine slits.

In some embodiments, a first liquid crystal alignment layer 350 may be disposed on the pixel electrodes 310. The first liquid crystal alignment layer 350 can induce the initial alignment of adjacent liquid crystals LC in the liquid crystal layer 30. As used herein, 'initial alignment of liquid crystals' refers to the alignment of liquid crystals in a state where no electric field has been formed in a liquid crystal layer. For example, the first liquid crystal alignment layer 350 may be a vertical alignment layer having an imide group in a repeating unit of a main chain and having a vertical alignment side chain.

Next, the liquid crystal layer 30 will be described. The liquid crystal layer 30 includes a plurality of initially aligned liquid crystals LC. As used herein, 'liquid crystal' refers to a single molecule having liquid crystal properties or a collection of single molecules. In an embodiment, the liquid crystals LC may have negative dielectric anisotropy and may be vertically aligned in an initial alignment state. In some embodiments, the liquid crystals LC may have a predetermined pretilt angle in the initial alignment state. The initial alignment of the liquid crystals LC may be induced by the first liquid crystal alignment layer 350 and a second liquid crystal alignment layer 950 which will be described later. When an electric field is formed between the pixel electrodes 310 and the common electrode 910, the liquid crystals LC may be tilted in a specific direction to change the polarization state of the light being transmitted vertically (in FIG. 2) through the liquid crystal layer 30. In an alternate embodiment, the liquid crystals LC may have positive dielectric anisotropy and may be horizontally aligned in the initial alignment state. When an electric field is formed, the liquid crystals LC may rotate in a specific direction in a plane to change the polarization state of the light being transmitted.

Next, the upper panel 21 will be described. The upper panel 21 includes a second base substrate 400, a color conversion pattern layer 610 and 630, and the common electrode 910. The upper panel 210 may further include a polarizer 801.

The second base substrate 400 may be a transparent substrate. For example, like the first base substrate 100, the second base substrate 400 may include a glass material, a quartz material, or a transparent plastic material. In some embodiments, the second base substrate 400 may be flexible, and the display device 1 may be a curved display device.

A light shielding member 510 may be disposed on a surface (a lower surface in FIG. 2) of the second base substrate 400. The light shielding member 510 may block the transmission of light. The light shielding member 510 may be disposed at planar boundaries between adjacent pixels to prevent color mixing between the neighboring pixels. For example, the light shielding member 510 may be in a substantially lattice shape in plan view.

In some embodiments, a first wavelength band filter 530 may be disposed on the light shielding member 510. The first wavelength band filter 530 is a wavelength-selective optical filter that transmits only some wavelength bands by transmitting light of a specific wavelength band and blocking light of another specific wavelength band. The first wavelength band filter 530 may be disposed in the second pixel PXb and the third pixel PXc but may not be disposed in the first pixel PXa. The first wavelength band filter 530 may overlap a first color conversion pattern 610 and a second color conversion pattern 630 which will be described later.

In an embodiment, the first wavelength band filter 530 may block light in the blue wavelength band among light received from the light source unit 50 and transmit light having a longer peak wavelength than blue, e.g., light in the green wavelength band and/or the red wavelength band. For example, the first wavelength band filter 530 may be a color filter that absorbs the blue wavelength band. The color filter may include a base resin and a colorant such as a pigment or dye dissolved or dispersed in the base resin. For another example, the first wavelength band filter 530 may be a distributed Bragg reflector that reflects the blue wavelength band.

Of light provided from the light source unit 50, the blue wavelength band transmitted through the first color conversion pattern 610 and the second color conversion pattern 630 without being color-converted by the first color conversion pattern 610 and the second color conversion pattern 630 may be blocked by the first wavelength band filter 530. Accordingly, the spectrum of light emitted through the second pixel PXb and the third pixel PXc can be made shaper, and the purity of the green color displayed by the second pixel PXb and the purity of the red color displayed by the third pixel PXc can be improved, thereby improving the display quality of the display device 1.

The color conversion pattern layer 610 and 630 may be disposed on the first wavelength band filter 530. The color conversion pattern layer 610 and 630 may include the first color conversion pattern 610 disposed in the second pixel PXb and the second color conversion pattern 630 disposed in the third pixel PXc. Each of the first color conversion pattern 610 and the second color conversion pattern 630 may convert the color of transmitted light into a color different from that of incident light. That is, light may be converted into light of a predetermined wavelength band as it passes through the first color conversion pattern 610 or the second color conversion pattern 630.

In an embodiment, each of the first color conversion pattern 610 and the second color conversion pattern 630 may include a material that converts or shifts the peak wavelength of incident light to another specific peak wavelength, that is, a wavelength shift material 610$p$ or 630$p$. Examples of the wavelength shift material 610$p$ or 630$p$ include a quantum dot, a quantum rod, and a phosphor material. For example, the quantum dot may emit light of a specific color when an electron transitions from a conduction band to a valence band. The quantum dot material may have a core-shell structure. The core may be a semiconductor nanocrystalline material. Examples of the core of the quantum dot include, but are not limited to, silicon (Si) nanocrystals, group II-VI compound nanocrystals, and group III-V compound nanocrystals. In a non-limiting example, the wavelength shift materials 610$p$ and 630$p$ may include a core made of any one of cadmium selenide (CdSe), cadmium telluride (CdTe), cadmium sulfide (CdS) and indium phosphide (InP) and an outer shell made of zinc sulfide (ZnS).

For example, the first wavelength shift material 610p of the first color conversion pattern 610 may absorb at least a portion of light received from the light source unit 50 and emit light having the peak wavelength of the green color. Therefore, the first color conversion pattern 610 can convert incident light into green light, and the second pixel PXb can display green. The green light emitted from the first wavelength shift material 610p may be radiated in various directions regardless of the incident angle and may contribute to the improvement of lateral visibility of the green color displayed by the display device 1.

In addition, the second wavelength shift material 630p of the second color conversion pattern 630 may absorb at least a portion of the light received from the light source unit 50 and emit light having the peak wavelength of the red color. Therefore, the second color conversion pattern 630 can convert incident light into red light, and the third pixel PXc can display red. The red light emitted from the second wavelength shift material 630p may be radiated in various directions regardless of the incident angle and may contribute to the improvement of lateral visibility of the red color displayed by the display device 1.

In a non-limiting example, the size of the second wavelength shift material 630p in the second color conversion pattern 630 may be greater than the size of the first wavelength shift material 610p in the first color conversion pattern 610. For example, the size of the first wavelength shift material 610p may be about 40 Å to about 50 Å, and the size of the second wavelength shift material 630p may be about 55 Å to about 65 Å.

In another embodiment, each of the first color conversion pattern 610 and the second color conversion pattern 630 may be a color filter that transmits light in a specific wavelength band and absorbs light in another specific wavelength band.

In some embodiments, a light transmission pattern 650 may be disposed in the first pixel PXa. The light transmission pattern 650 may transmit transmitted light without substantially changing the color of the transmitted light. That is, light that passes through the light transmission pattern 650 may have substantially the same color as light provided by the light source unit 50. The light transmittance of the light transmission pattern 650 may be about 85 percent (%) or more, about 90% or more, about 92% or more, or about 95% or more.

The light transmission pattern 650 may include a base resin and light scattering particles 650p dispersed in the base resin. The material used for the base resin is not particularly limited as long as it has a high light transmittance and is excellent in dispersing the light scattering particles 650p. For example, the base resin may be made of an organic material such as epoxy resin, acrylic resin, cardo resin, or imide resin. The light scattering particles 650p may have a refractive index different from that of the base resin to form an optical interface with the base resin. The material used for the light scattering particles 650p is not particularly limited as long as the material can scatter at least a portion of transmitted light. For example, the light scattering particles 650p may be metal oxide particles or organic particles. Examples of the metal oxide include titanium oxide ($TiO_2$), zirconium oxide ($ZrO_2$), aluminum oxide ($Al_2O_3$), indium oxide ($In_2O_3$), zinc oxide (ZnO), and tin oxide ($SnO_2$). Examples of the organic material include acrylic resin and urethane resin. The light transmission pattern 650 may transmit blue light without substantially changing the color of the light received from the light source unit 50. Therefore, the first pixel PXa can display the blue color. The blue light scattered in various directions by the light scattering particles 650p in the light transmission pattern 650 can contribute to the improvement of lateral visibility of the blue color displayed by the display device 1. In other embodiments, the light transmission pattern 650 may be omitted.

A second wavelength band filter 550 may be disposed on the color conversion pattern layer 610 and 630 and the light transmission pattern 650. The second wavelength band filter 550 is a wavelength-selective optical filter that transmits only some wavelength bands by transmitting light of a specific wavelength band and blocking light of another specific wavelength band. The second wavelength band filter 550 may be disposed in all of the first pixel PXa, the second pixel PXb and the third pixel PXc.

In an embodiment, the second wavelength band filter 550 may transmit light in the blue wavelength band and reflect light having a longer peak wavelength than blue, e.g., light in the green wavelength band and/or the red wavelength band. For example, the second wavelength band filter 550 may be a distributed Bragg reflector that transmits the blue wavelength band. The distributed Bragg reflector may include a plurality of layers stacked on each other. In a non-limiting example, the distributed Bragg reflector may include a low refractive layer and a high refractive layer stacked alternately. The transmission wavelength band and the reflection wavelength band of the second wavelength band filter 550 can be controlled by the difference between refractive indices of the low refractive layer and the high refractive layer, the difference between thicknesses of the low refractive layer and the high refractive layer, and the number of repeating units formed by the low refractive layer and the high refractive layer.

Of the green light emitted in various directions from the first wavelength shift material 610p and the red light emitted in various directions from the second wavelength shift material 630p, light emitted toward the second wavelength band filter 550 (a lower side in FIG. 2) may be reflected by the second wavelength band filter 550 toward the second base substrate 400 (an upper side in FIG. 2), that is, the viewer side, so that the reflected light can contribute to color display. This can increase light utilization efficiency and improve the display quality (e.g., luminance and color purity) of the display device 1. In addition, the spectrum of the blue light provided by the light source unit 50 can be made sharper, and the color purity of the blue light incident on the first color conversion pattern 610 and the second color conversion pattern 630 can be improved.

A planarization layer 710 may be disposed on the second wavelength band filter 550. The planarization layer 710 may minimize a step difference between a plurality of elements stacked on the second base substrate 400, thereby improving the polarization performance of the polarizer 801 to be described later. The planarization layer 710 may be disposed in all of the first pixel PXa, the second pixel PXb, and the third pixel PXc. The material of the planarization layer 710 is not particularly limited as long as it is a material having excellent planarization properties and light transmittance. For example, the planarization layer 710 may be made of epoxy resin, acrylic resin, cardo resin, imide resin, siloxane resin or silsesquioxane resin.

In some embodiments, an inorganic protective layer 730 may be disposed on the planarization layer 710. The inorganic protective layer 730 may include a non-metallic inorganic material. Examples of the inorganic material that forms the inorganic protective layer 730 include silicon oxide, silicon nitride, silicon oxynitride, and silicon nitride oxide. The inorganic protective layer 730 can protect the planarization layer 710 from being damaged in the process of forming the polarizer 801 which will be described later. When wire patterns 811 of the polarizer 801 are formed by a dry etching process, the inorganic protective layer 730 may serve as an eth stopper to prevent the planarization layer 710 from being unintentionally etched. In addition, the inorganic protective layer 730 can improve the adhesion of the wire patterns 811 to the planarization layer 710 made of an organic material and prevent damage or corrosion of the wire patterns 811 due to penetration of air or moisture, thereby improving the reliability of the display device 1. If the polarizer 801 is disposed directly on the inorganic protective layer 730, the inorganic protective layer 730 may form the base of the polarizer 801. In another embodiment, the inorganic protective layer 730 may be omitted, and the polarizer 801 may be disposed directly on the planarization layer 710. In this case, the planarization layer 710 may form the base of the polarizer 801.

The polarizer 801 may be disposed on the inorganic protective layer 730. The polarizer 801 may control the amount of light transmitted through the display panel 41 by performing an optical shutter function together with the liquid crystal layer 30 and another polarizer (not illustrated). The other polarizer may be disposed at an arbitrary position between the liquid crystal layer 30 and the light source unit 50. In one embodiment, the polarizer 801 may be a reflective polarizer including a wire grid pattern layer and having reflective polarizing properties. As used herein, 'reflective polarizing properties' refer to polarizing transmitted light by transmitting a polarization component oscillating in a direction parallel to a transmission axis and partially reflecting a polarization component oscillating in a direction intersecting the transmission axis.

Of light emitted in various directions from the first wavelength shift material 610p and the second wavelength shift material 630p and light emitted in various directions from the light scattering particles 650p, at least a portion of light transmitted through the second wavelength band filter 550 without being completely blocked by the second wavelength band filter 550 and then emitted toward the polarizer 801 may be reflected by the polarizer 801 having the reflective polarizing properties toward the second base substrate 400, that is, the viewer side, so that the reflected light can contribute to color display.

Figure 3:
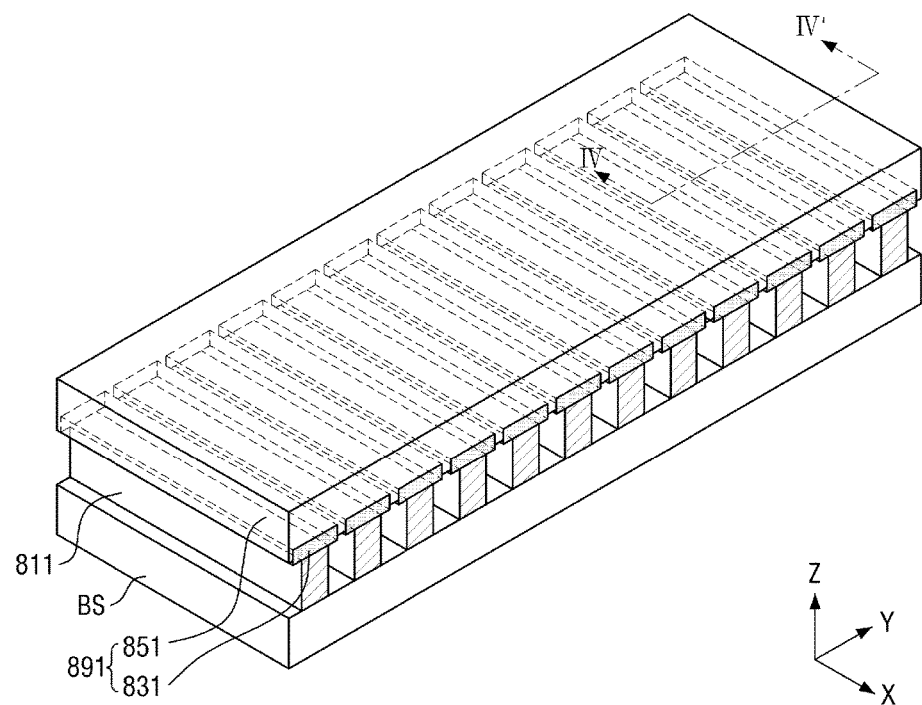
FIG. 3 is a perspective view of a polarizer of FIG. 2.
Figure 4:
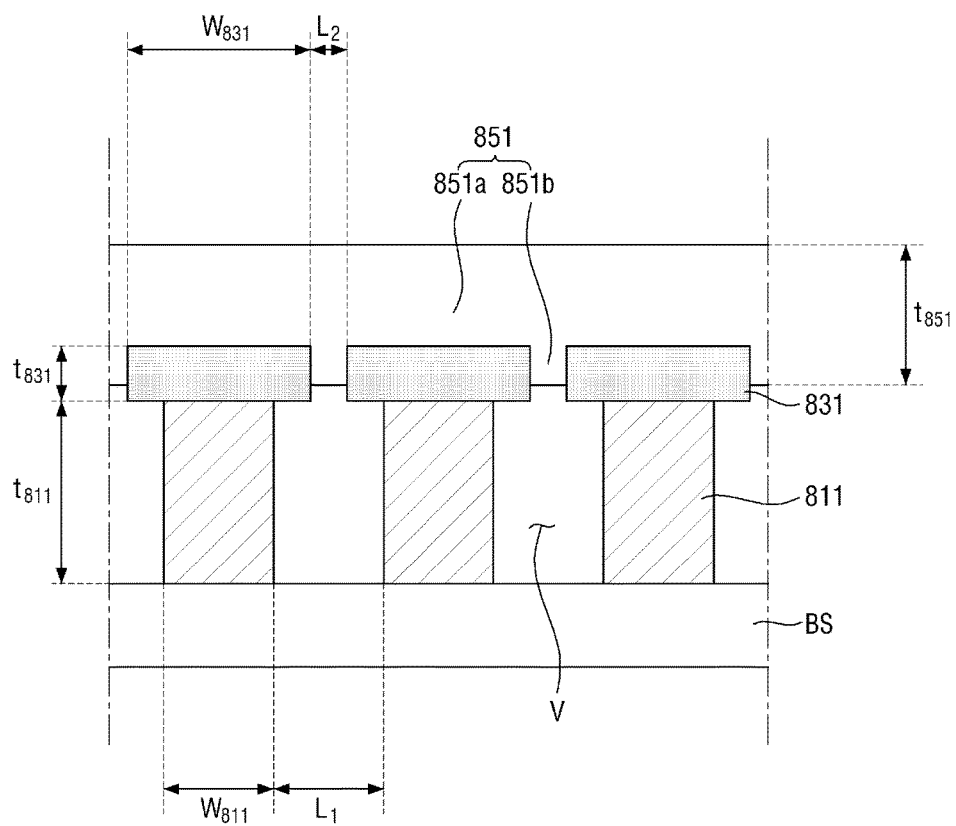
FIG. 4 is a cross-sectional view taken along the line IV-IV' of FIG. 3.

The polarizer 801 will be described in detail later by additionally referring to FIGS. 3 and 4.

The common electrode 910 may be disposed on the polarizer 801. For example, the common electrode 910 may be disposed directly on an organic capping layer 851 of the polarizer 801. The common electrode 910 may be disposed in all of the first pixel PXa, the second pixel PXb and the third pixel PXc without distinction between the first through third pixels PXa through PXc, and a common voltage may be applied to the common electrode 910. Like the pixel electrodes 310, the common electrode 910 may be made of a transparent conductive material. In a non-limiting example, the common electrode 910 may be disposed directly on the polarizer 801.

In some embodiments, the second liquid crystal alignment layer 950 may be disposed on the common electrode 910. The second liquid crystal alignment layer 950 can induce the initial alignment of adjacent liquid crystals LC in the liquid crystal layer 30. Like the first liquid crystal alignment layer 350, the second liquid crystal alignment layer 950 may also be, but is not limited to, a vertical alignment layer having an imide group in a repeating unit of a main chain and having a vertical alignment side chain.

The polarizer 801 will now be described in detail by additionally referring to FIGS. 3 and 4. FIG. 3 is a perspective view of the polarizer 801 of FIG. 2. FIG. 4 is a cross-sectional view taken along the line IV-IV' of FIG. 3.

Referring to FIGS. 1 through 4, the polarizer 801 according to the current embodiment includes a base BS, a wire grid pattern layer including a plurality of wire patterns 811, and a capping layer 891.

The base BS may provide a space in which the wire patterns 811 can be disposed. For example, the base BS may correspond to the inorganic protective layer 730 or the planarization layer 710 of the display device 1 of FIG. 2. The base BS of the polarizer 801 according to the current embodiment can also be provided as a separate plate member in the shape of a substrate or a film.

The wire grid pattern layer including the wire patterns 811 may be disposed on the base BS. The wire patterns 811 may extend in a first direction X and may be spaced apart from each other in a second direction Y. The wire grid pattern layer including the wire patterns 811 may have reflective polarizing properties. For example, the wire grid pattern layer may transmit a polarization component oscillating in a direction substantially parallel to the direction (i.e., the second direction Y) in which the wire patterns 811 are spaced apart from each other and partially reflect a polarization component oscillating in a direction substantially parallel to the direction (i.e., the first direction X) in which the wire patterns 811 extend. That is, the separation direction of the wire pattern 811 may define the direction of the transmission axis, and the extending direction of the wire pattern 811 may define the direction of the reflection axis.

The material of the wire patterns 811 is not particularly limited as long as it is a material that is easy to process and has high light reflectance. For example, the wire patterns 811 may include a metallic material or a non-metallic inorganic material. The wire patterns 811 made of a material having high light reflectance may be excellent in reflecting a polarization component oscillating in a direction parallel to the reflection axis.

Examples of the metallic material include aluminum (Al), silver (Ag), gold (Au), copper (Cu), titanium (Ti), molybdenum (Mo), nickel (Ni), oxides of these materials, and alloys of these materials. In addition, examples of the non-metallic inorganic material include silicon oxide, silicon nitride, silicon oxynitride, and silicon nitride oxide. In FIG. 4, each of the wire patterns 811 is illustrated as a single layer. In other embodiments, each of the wire patterns 811 may also be a stacked structure of a plurality of layers.

In a non-limiting example, a width $W_{811}$ of the wire patterns 811 in the second direction Y may be about 20 nm to about 80 nm. Also, a distance $L_1$ between adjacent wire patterns 811 may be about 20 nm to about 80 nm. In addition, a thickness $t_{811}$ of the wire patterns 811 in a third direction Z may be, but is not limited to, about 1,000 Å to about 2,500 Å.

The capping layer 891 may be disposed on the wire grid pattern layer including the wire patterns 811. In an embodiment, the capping layer 891 may include an inorganic capping layer having a plurality of inorganic capping patterns 831 and an organic capping layer 851.

The inorganic capping patterns 831 may be disposed on the wire patterns 811. For example, the inorganic capping patterns 831 may be disposed at positions corresponding to those of the wire patterns 811. That is, the inorganic capping patterns 831 may overlap the wire patterns 811 in the third direction Z, respectively. As shown in FIG. 4, the inorganic capping patterns 831 are disposed directly on the wire patterns 811, respectively, and the sides of each of the inorganic capping pattern 831 protrude beyond the sides of each of the wire patterns 811.

In an embodiment, the inorganic capping patterns 831 may extend in the first direction X and may be spaced apart from each other in the second direction Y. In FIG. 4, etc., the inorganic capping patterns 831 are quadrilateral in a cross section cut along the second direction Y. However, the cross-sectional shape of the inorganic capping patterns 831 is not limited to the quadrilateral shape.

A space may be formed between adjacent inorganic capping patterns 831 spaced apart from each other. A width $W_{831}$ of the inorganic capping patterns 831 in the second direction Y may be greater than the width $W_{811}$ of the wire patterns 811 in the second direction Y. In a non-limiting example, the width $W_{831}$ of the inorganic capping patterns 831 may be about 25 nm to about 110 nm. In addition, a distance $L_2$ between adjacent inorganic capping patterns 831 may be smaller than the distance $L_1$ between the wire patterns 811. The distance $L_2$ between the inorganic capping patterns 831 may be about 15 nm to about 50 nm. In addition, the width $W_{831}$ of the inorganic capping patterns 831 in the second direction Y may be greater than the distance $L_2$ between adjacent inorganic capping patterns 831. In some embodiments, a thickness $t_{831}$ of the inorganic capping patterns 831 in the third direction Z may be smaller than the thickness $t_{811}$ of the wire patterns 811. The thickness $t_{831}$ of the inorganic capping patterns 831 may have a certain relationship with the width $W_{831}$ of and the distance $L_2$ between the inorganic capping patterns 831. For example, the thickness $t_{831}$ of the inorganic capping patterns 831 may be about 800 Å to about 1,500 Å.

The material that forms the inorganic capping patterns 831 is not particularly limited as long as it is excellent in blocking the penetration of gas or vapor. For example, the inorganic capping patterns 831 may include a transparent metallic material or a non-metallic inorganic material. Examples of the transparent metallic material include indium tin oxide (ITO), indium zinc oxide (IZO), zinc oxide (ZnO), indium (III) oxide ($In_2O_3$), indium gallium oxide (IGO), and aluminum zinc oxide (AZO). In addition, examples of the non-metallic inorganic material include silicon oxide, silicon nitride, silicon oxynitride, and silicon nitride oxide. In some embodiments, the inorganic capping patterns 831 may be made of a material different from that of the inorganic protective layer 730 described above. In a non-limiting example, the inorganic protective layer 730 may include silicon oxide, and the inorganic capping patterns 831 may include silicon nitride. In another example, the inorganic protective layer 730 may include a non-metallic inorganic material, and the inorganic capping pattern 831 may include a metallic material.

The organic capping layer 851 may be disposed on the inorganic capping layer including the inorganic capping patterns 831. The organic capping layer 851 may be made of an organic material such as epoxy resin, acrylic resin, cardo resin, or imide resin.

In an embodiment, at least a portion of the organic capping layer 851 may be partially inserted into each space between the inorganic capping patterns 831. That is, the organic capping layer 851 may include a cover portion 851a which covers upper surfaces of the inorganic capping patterns 831 and an insertion portion 851b which protrudes downward from the cover portion 851a to be inserted into each space between adjacent inorganic capping patterns 831. The cover portion 851a and the insertion portion 851b of the organic capping layer 851 may be integrally formed with each other without a physical boundary between the cover portion 851a and the insertion portion 851b.

The insertion portion 851b of the organic capping layer 851 may be located between every two adjacent inorganic capping patterns 831. That is, the insertion portion 851b of the organic capping layer 851 may be disposed at a position corresponding to each space between the wire patterns 811 and may not overlap the wire patterns 811 in the third direction Z.

The insertion portion 851b of the organic capping layer 851 may be in contact with side surfaces of the inorganic capping patterns 831, and the cover portion 851a of the organic capping layer 851 may be in contact with the upper surfaces of the inorganic capping patterns 831. In this case, the width of the insertion portion 851b of the organic capping layer 851 in the second direction Y may be substantially equal to the distance $L_2$ between adjacent inorganic capping patterns 831 in the second direction Y. In some embodiments, a maximum thickness $t_{851}$ of the organic capping layer 851 including the cover portion 851a and the insertion portion 851b may be about 500 nm or more.

An insertion depth of the insertion portion 851b of the organic capping layer 851 may be smaller than the thickness $t_{831}$ of the inorganic capping patterns 831. That is, a lowest surface of the organic capping layer 851 may be, but not necessarily, at a higher level than bottom surfaces of the inorganic capping patterns 831.

A void V may be defined in each space surrounded by the base BS of the polarizer 801, adjacent wire patterns 811 and the capping layer 891. Like the wire patterns 811, the voids V may extend in the first direction X. The voids V may be filled with gas such as air or may be substantially in a vacuum state. In the polarizer 801 according to the current embodiment, since the capping layer 891 is disposed on the wire grid pattern layer including the wire patterns 811, the void V can be stably formed in each space between adjacent wire patterns 811. Accordingly, the polarization performance of the polarizer 801 can be further improved. Moreover, since the organic capping layer 851 is partially inserted into each space between adjacent inorganic capping patterns 831 to seal the void V, an improvement in the durability and reliability of the polarizer 801 can be expected.

Figure 5:
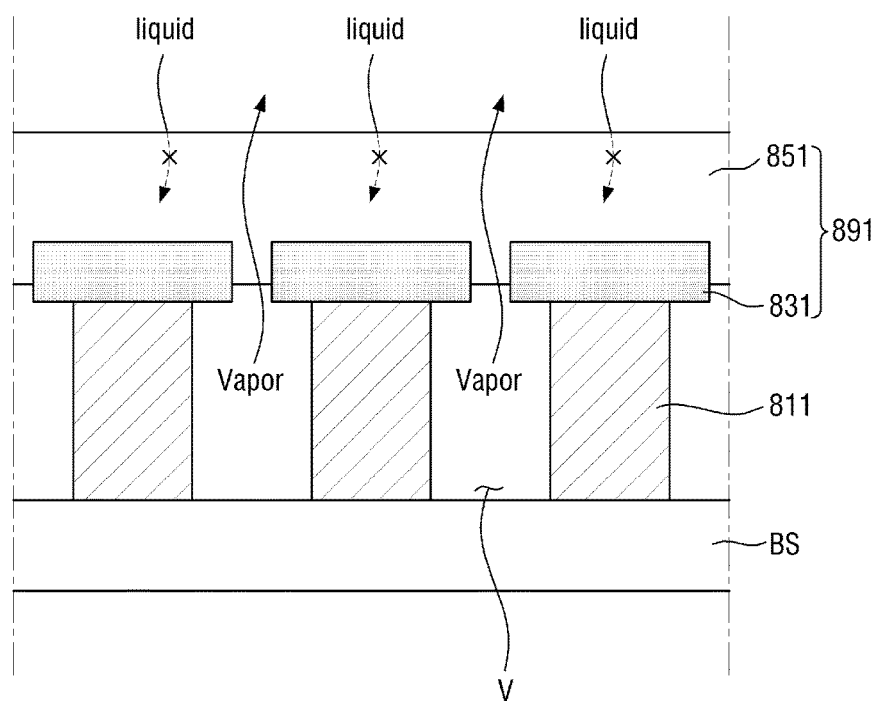
FIG. 5 is a view for explaining the effects of the polarizer of FIG. 3.

The effects of the polarizer 801 according to the current embodiment will now be described in detail by additionally referring to FIG. 5. FIG. 5 is a view for explaining the effects of the polarizer 801 of FIG. 3.

Referring to FIGS. 1 through 5, the capping layer 891 disposed on the wire grid pattern layer of the polarizer 801 according to the current embodiment includes a portion (e.g., the inorganic capping patterns 831) of the inorganic capping layer and a portion (e.g., the insertion portion 851b) of the organic capping layer 851 arranged alternately along the second direction Y. Therefore, the capping layer 891 can suppress the occurrence of defects in the polarizer 801 during or after the process of manufacturing the polarizer 801.

In addition, a space is formed between adjacent inorganic capping patterns 831. For example, the distance $L_2$ between adjacent inorganic capping patterns 831 may be about 15 nm or more. This can facilitate the discharge of vapor or gas generated from the base BS, the wire patterns 811 or the inside of the voids V during a process subsequent to the manufacture of the polarizer 801. Although embodiments are not limited to this case, if the wire patterns 811 are formed by a dry etching process, it can be understood that the gas has been generated by re-vaporization of gas molecules adsorbed on the base BS or the wire patterns 811. If a polarizer from which the gas has not been fully discharged is applied to a display device, an unintended gas collecting layer may be formed inside the display device, or the gas may be condensed again, or the gas may lift an element (e.g., the common electrode) disposed on the polarizer. However, the space between the inorganic capping patterns 831 of the polarizer 801 according to the current embodiment provides a passage through which gas can be discharged, and the gas discharged through the passage between the inorganic capping patterns 831 can be smoothly discharged through the organic capping layer 851 that is relatively easy to permeate.

In addition, the distance $L_2$ between adjacent inorganic capping patterns 831 is made smaller than the distance $L_1$ between adjacent wire patterns 811. For example, the distance $L_2$ between adjacent inorganic capping patterns 831 may be about 50 nm or less. Therefore, it is possible to prevent a material for forming the organic capping layer 851 from completely filling the voids V in the process of forming the organic capping layer 851. Without sufficient voids V, the polarization performance of the polarizer 801 can be sharply degraded.

Furthermore, the organic capping layer 851 is formed on the inorganic capping layer including the inorganic capping patterns 831 and is partially inserted into each space between the inorganic capping patterns 831. Therefore, it is possible to prevent a process liquid such as a cleaning liquid used in a process subsequent to the manufacture of the polarizer 801 from penetrating into the polarizer 801. That is, the wire patterns 811 and the inorganic capping layer including the inorganic capping patterns 831 are capped with the organic capping layer 851 which is excellent in blocking the penetration of a liquid material such as a process liquid. In particular, the organic capping layer 851 is inserted into each space between the inorganic capping patterns 831. Therefore, the organic capping layer 851 having a sufficient thickness can be formed in an area overlapping each space between the wire patterns 811. Accordingly, this can prevent a liquid material such as a process liquid from penetrating between the wire patterns 811 to fill and remain in the voids V or to cause damage or corrosion of the wire patterns 811.

Hereinafter, polarizers and display devices including the polarizers according to alternate embodiments will be described. For simplicity, a description of elements substantially identical to those of the polarizer 801 and the display device 1 according to the embodiment of FIG. 1, etc. will be omitted, and the substantially identical elements will be clearly understood by those skilled in the art from the attached drawings.

Figure 6:
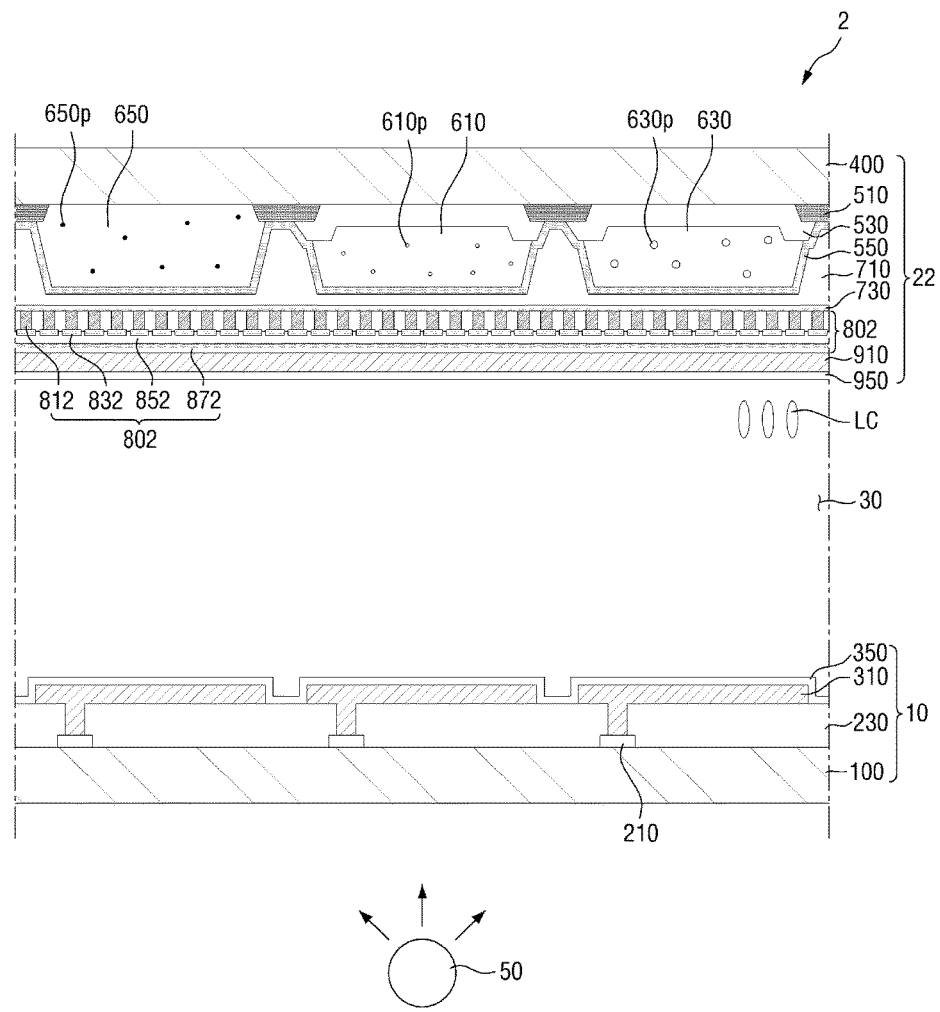
FIG. 6 is a cross-sectional view of a display device according to an alternate embodiment.
Figure 7:
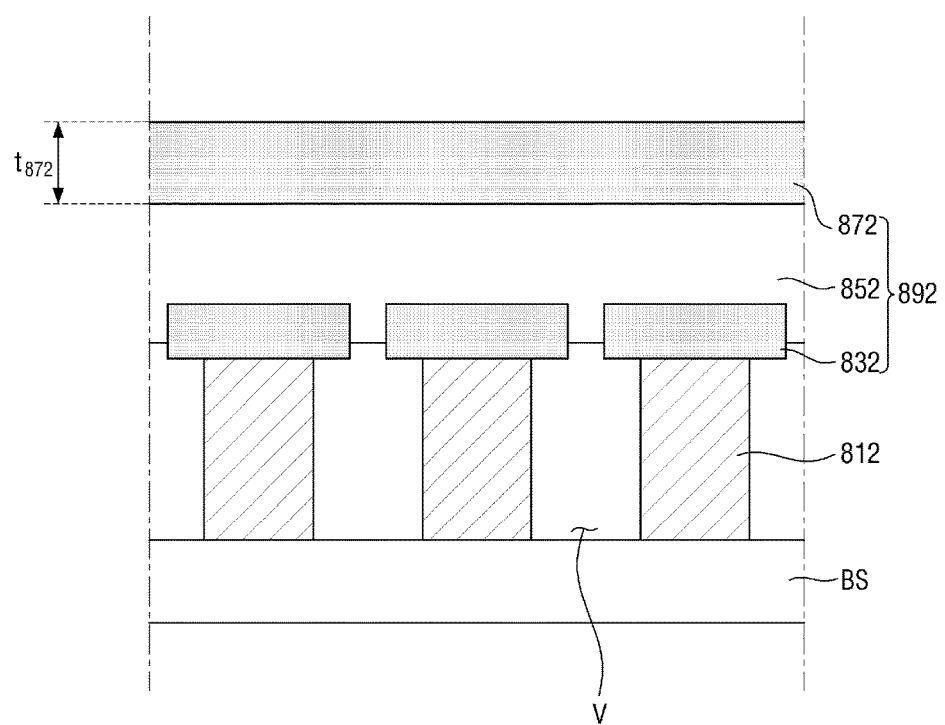
FIG. 7 is a cross-sectional view of a polarizer of FIG. 6.

FIG. 6 is a cross-sectional view of a display device 2 according to an alternate embodiment. FIG. 7 is a cross-sectional view of a polarizer 802 of FIG. 6.

Referring to FIGS. 6 and 7, the polarizer 802 of the display device 2 according to the current embodiment is different from the polarizer 801 according to the embodiment of FIG. 1, etc. in that a capping layer 892 of the polarizer 802 further includes a second inorganic capping layer 872.

In an embodiment, the polarizer 802 includes wire patterns 812 and the capping layer 892 disposed on the wire patterns 812. The capping layer 892 may include a first inorganic capping layer including a plurality of inorganic capping patterns 832 and an organic capping layer 852 disposed on the first inorganic capping layer and may further include the second inorganic capping layer 872 disposed on the organic capping layer 852.

Since the first inorganic capping layer including the inorganic capping patterns 832 and the organic capping layer 852 have been described above, the description thereof will be omitted.

The second inorganic capping layer 872 may be disposed on the organic capping layer 852. For example, the second inorganic capping layer 872 may be disposed directly on the organic capping layer 852. The second inorganic capping layer 872 may be formed as a single piece over the wire patterns 812 and the inorganic capping patterns 832. That is, the second inorganic capping layer 872 may overlap the wire patterns 812 and the inorganic capping patterns 832. A thickness $t_{872}$ of the second inorganic capping layer 872 may be substantially uniform. For example, the thickness $t_{872}$ of the second inorganic capping layer 872 may be about 2,000 Å to about 5,000 Å. When the thickness $t_{872}$ of the second inorganic capping layer 872 is about 2,000 Å or more, the second inorganic capping layer 872 can be expected to fully block the penetration of a liquid material such as a process liquid. When the thickness $t_{872}$ of the second inorganic capping layer 872 is about 5,000 Å or less, it may be advantageous for the penetration of gas or vapor emitted from the inside of the polarizer 802.

The second inorganic capping layer 872 may include an inorganic material such as silicon oxide, silicon nitride, silicon oxynitride, or silicon nitride oxide. The inorganic capping patterns 832 of the first inorganic capping layer and the second inorganic capping layer 872 may be made of the same or different materials.

Since the polarizer 802 according to the current embodiment further includes the second inorganic capping layer 872 which covers an upper surface of the organic capping layer 852, a liquid material such as a process liquid can be more thoroughly prevented from penetrating into the polarizer 802 in a process subsequent to the manufacture of the polarizer 802.

When the capping layer 892 of the polarizer 802 includes the second inorganic capping layer 872, a common electrode 910 of the display device 2 according to the current embodiment may be disposed directly on the second inorganic capping layer 872 of the polarizer 802.

Figure 8:
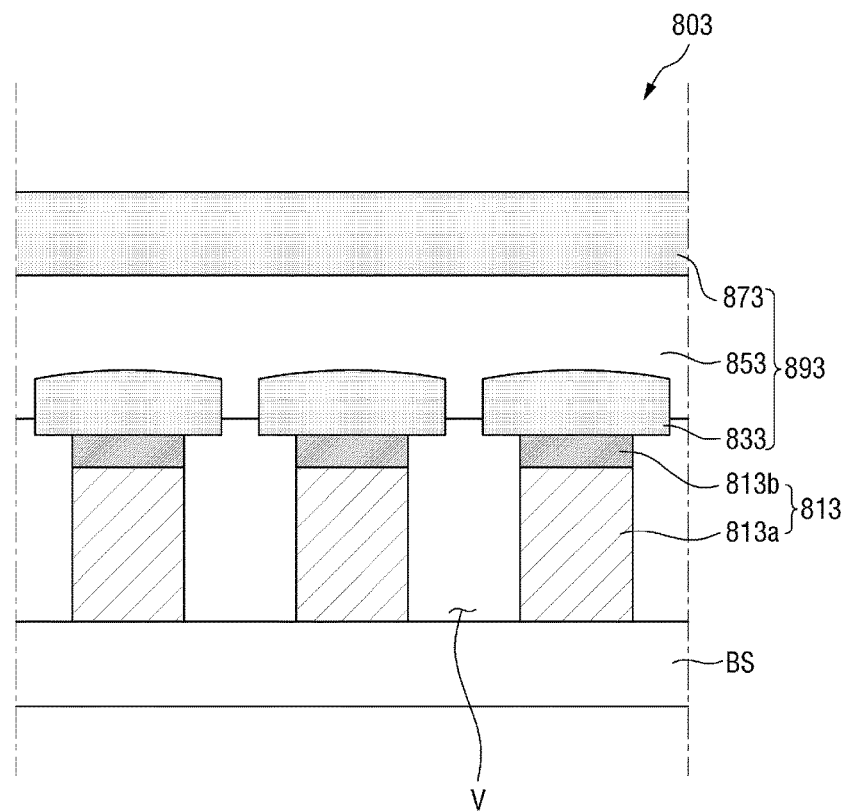
FIGS. 8 through 12 are respectively cross-sectional views of polarizers according to alternate embodiments.

FIG. 8 is a cross-sectional view of a polarizer 803 according to an alternate embodiment.

Referring to FIG. 8, the polarizer 803 according to the current embodiment is different from the polarizer 802 according to the embodiment of FIG. 7 in that each wire pattern 813 has a stacked structure of a first wire pattern 813a and a second wire pattern 813b.

In an embodiment, the wire patterns 813 may include the first wire patterns 813a containing a metallic material and the second wire patterns 813b containing a non-metallic inorganic material. When the second wire patterns 813b containing the non-metallic inorganic material are disposed between the first wire patterns 813a containing the metallic material and inorganic capping patterns 833 of a capping layer 893, respectively, the first wire patterns 813a of the wire patterns 813 can excellently reflect light incident from below (in FIG. 8).

The width of the first wire patterns 813a and the width of the second wire patterns 813b may be substantially the same. In another embodiment, the width of the second wire patterns 813b may be smaller than the width of the first wire patterns 813a. For example, the second wire patterns 813b may be disposed directly on the first wire patterns 813a, and the inorganic capping patterns 833 may be disposed directly on the second wire patterns 813b. Although each of the first wire patterns 813a is illustrated as a single layer in FIG. 8, it may also be a stacked structure of a plurality of metal material layers in other embodiments.

In the present embodiment, the capping layer 893 includes the first inorganic capping layer including the inorganic capping patterns 833, an organic capping layer 853, and a second inorganic capping layer 873. Since the first inorganic capping layer including the inorganic capping patterns 833, the organic capping layer 853, and the second inorganic capping layer 873 have been described above, the description thereof will be omitted. In some embodiments, upper surfaces of the inorganic capping patterns 833 may be curved. In another embodiment, the second inorganic capping layer 873 may be omitted.

A void V may be defined in each space surrounded by a base BS of the polarizer 803 according to the current embodiment, adjacent first wire patterns 813a, adjacent second wire patterns 813b, and the capping layer 893.

Although not illustrated in the drawing, the polarizer 803 according to the current embodiment can be applied in place of the polarizer 801 of the display device 1 according to the embodiment of FIG. 2 or the polarizer 802 of the display device 2 according to the embodiment of FIG. 6.

Figure 9:
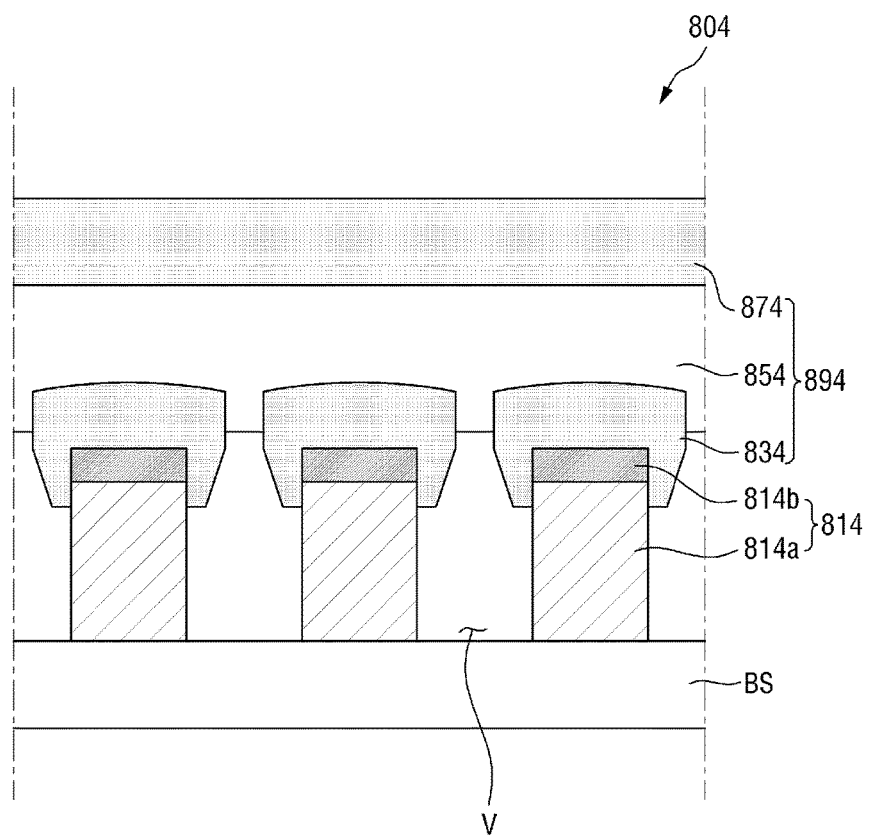

FIG. 9 is a cross-sectional view of a polarizer 804 according to an alternate embodiment.

Referring to FIG. 9, the polarizer 804 according to the current embodiment is different from the polarizer 802 according to the embodiment of FIG. 7 in that at least a portion of each inorganic capping pattern 834 of a capping layer 894 is located between a plurality of adjacent wire patterns 814.

In an embodiment, the inorganic capping patterns 834 of a first inorganic capping layer may partially protrude further downward. Therefore, at least a portion of each inorganic capping pattern 834 may be located between adjacent wire patterns 814. For example, the inorganic capping patterns 834 may be in contact with side surfaces of the wire patterns 814. In addition, lowest surfaces of the inorganic capping patterns 834 may be located at a lower level than upper surfaces of first wire patterns 814a.

In the present embodiment, the capping layer 894 includes the first inorganic capping layer including the inorganic capping patterns 834, an organic capping layer 854, and a second inorganic capping layer 874. Since the wire patterns 814 including the first wire patterns 814a and second wire patterns 814b, the organic capping layer 854, and the second inorganic capping layer 874 have been described above, the description thereof will be omitted.

In FIG. 9, the inorganic capping patterns 834 are in contact with side surfaces of the first wire patterns 814a and side surfaces of the second wire patterns 814b. However, in an alternate embodiment, the inorganic capping patterns 834 may be in contact with the side surfaces of the second wire patterns 814b but may not be in contact with the side surfaces of the first wire patterns 814a In an alternate embodiment, the second inorganic capping layer 874 may be omitted.

A void V may be defined in each space surrounded by a base BS of the polarizer 804 according to the current embodiment, adjacent first wire patterns 814a, and the capping layer 894.

Although not illustrated in the drawing, the polarizer 804 according to the current embodiment can be applied in place of the polarizer 801 of the display device 1 according to the embodiment of FIG. 2 or the polarizer 802 of the display device 2 according to the embodiment of FIG. 6.

Figure 10:
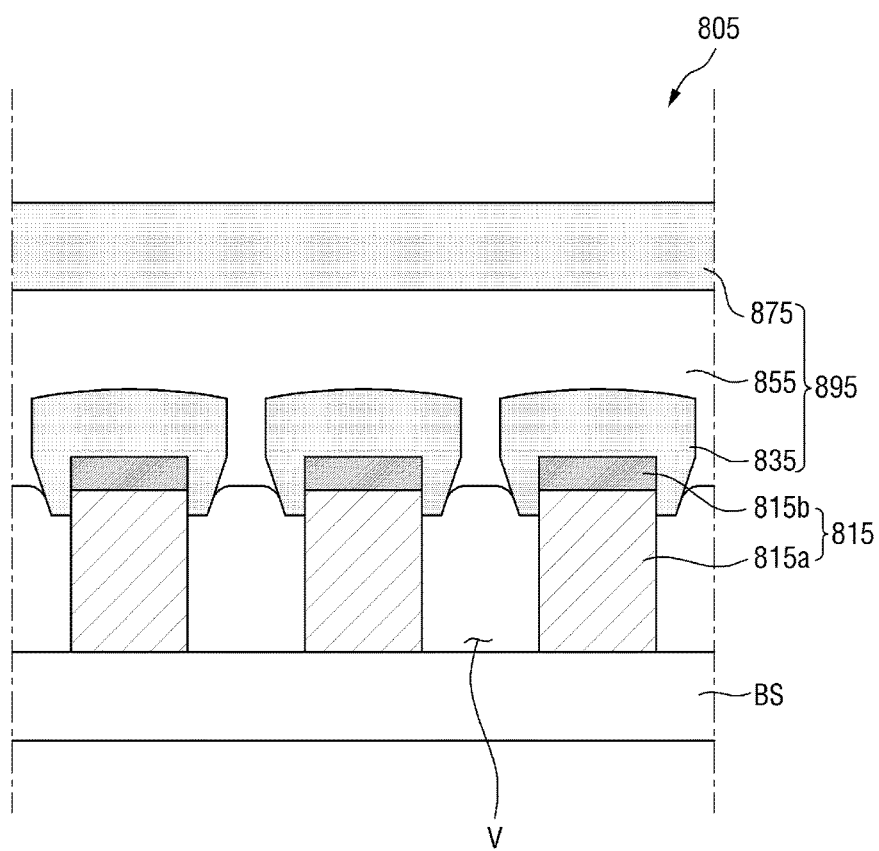

FIG. 10 is a cross-sectional view of a polarizer 805 according to an alternate embodiment.

Referring to FIG. 10, the polarizer 805 according to the current embodiment is different from the polarizer 803 according to the embodiment of FIG. 8 in that at least a portion of an organic capping layer 855 of a capping layer 895 is located between a plurality of adjacent wire patterns 815.

In an embodiment, the organic capping layer 855 may partially protrude further downward. Therefore, at least a portion of the organic capping layer 855, specifically, an insertion portion of the organic capping layer 855 which is inserted between a plurality of adjacent inorganic capping patterns 835 may be located between adjacent wire patterns 815. That is, at least a portion of the organic capping layer 855 may be inserted into each space between adjacent wire patterns 815. For example, a lowest surface of the organic capping layer 855 may be located at a lower level than upper surfaces of the wire patterns 815. In addition, the lowest surface of the organic capping layer 855 may be located at a higher level than lowest surfaces of the inorganic capping patterns 835.

In the present embodiment, the capping layer 895 includes the first inorganic capping layer including the inorganic capping patterns 835, the organic capping layer 855, and a second inorganic capping layer 875. Since the wire patterns 815 including first wire patterns 815a and second wire patterns 815b, the first inorganic capping layer including the inorganic capping patterns 835, and the second inorganic capping layer 875 have been described above, the description thereof will be omitted. In an alternate embodiment, the second inorganic capping layer 875 may be omitted.

A void V may be defined in each space surrounded by a base BS of the polarizer 805 according to the current embodiment, and adjacent first wire patterns 815a and the organic capping layer 855.

Although not illustrated in the drawing, the polarizer 805 according to the current embodiment can be applied in place of the polarizer 801 of the display device 1 according to the embodiment of FIG. 2 or the polarizer 802 of the display device 2 according to the embodiment of FIG. 6.

Figure 11:
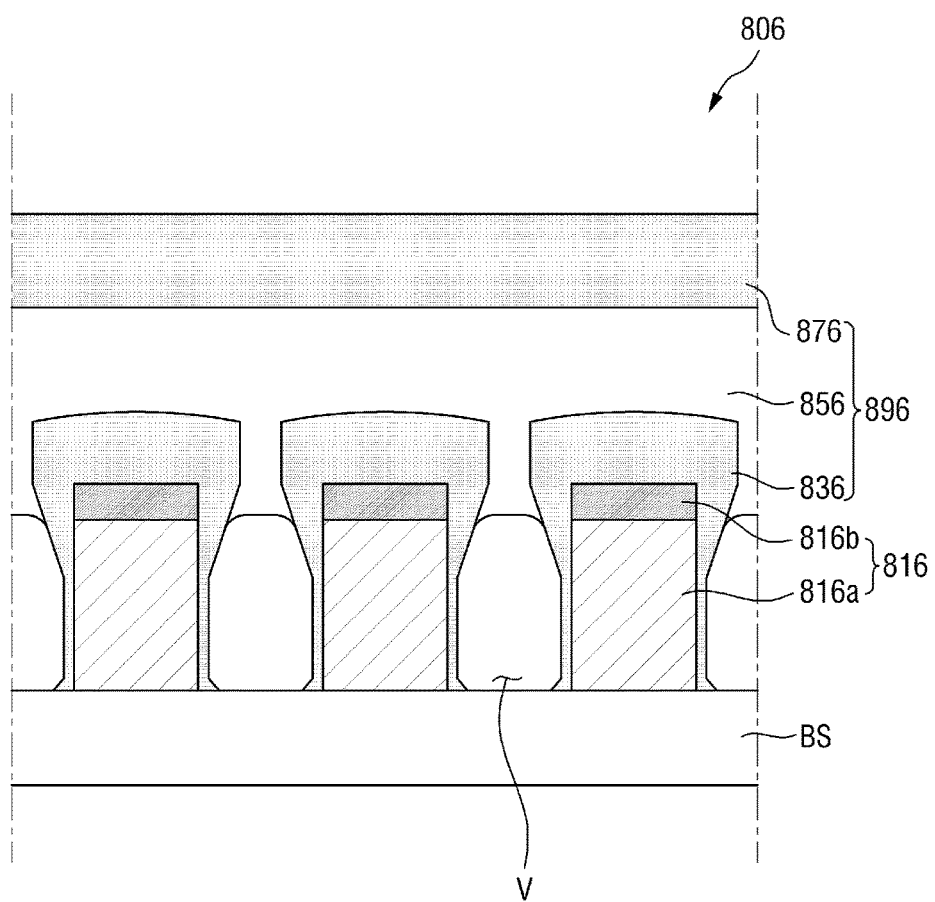

FIG. 11 is a cross-sectional view of a polarizer 806 according to an alternate embodiment.

Referring to FIG. 11, the polarizer 806 according to the current embodiment is different from the polarizer 805 according to the embodiment of FIG. 10 in that inorganic capping patterns 836 of a capping layer 896 are partially in contact with a base BS of the polarizer 806.

In an embodiment, the inorganic capping patterns 836 of a first inorganic capping layer may protrude further downward. Therefore, at least a portion of each of the inorganic capping patterns 836 may contact the base BS. For example, the thickness of the inorganic capping patterns 836 located on side surfaces of wire patterns 816 may gradually decrease toward the bottom.

In the present embodiment, the capping layer 896 includes the first inorganic capping layer including the inorganic capping patterns 836, an organic capping layer 856, and a second inorganic capping layer 876. Since the wire patterns 816 including first wire patterns 816a and second wire patterns 816b, the organic capping layer 856, and the second inorganic capping layer 876 have been described above, the description thereof will be omitted. In an alternate embodiment, the second inorganic capping layer 876 may be omitted.

A void V may be defined in each space surrounded by the base BS of the polarizer 806 according to the current embodiment, adjacent inorganic capping patterns 836, and the organic capping layer 856.

Although not illustrated in the drawing, the polarizer 806 according to the current embodiment can be applied in place of the polarizer 801 of the display device 1 according to the embodiment of FIG. 2 or the polarizer 802 of the display device 2 according to the embodiment of FIG. 6.

Figure 12:
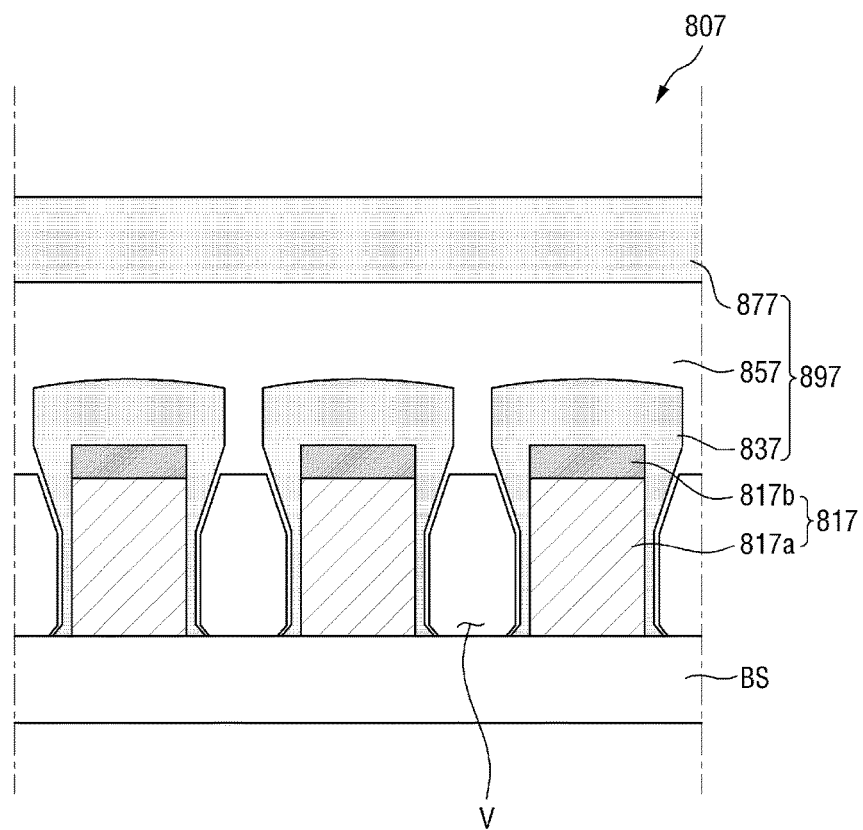

FIG. 12 is a cross-sectional view of a polarizer 807 according to an alternate embodiment.

Referring to FIG. 12, the polarizer 807 according to the current embodiment is different from the polarizer 806 according to the embodiment of FIG. 11 in that an organic capping layer 857 of a capping layer 897 is partially in contact with a base BS of the polarizer 807.

In an embodiment, the organic capping layer 857 may protrude further downward so that at least a portion of the organic capping layer 857 contacts the base BS. For example, the thickness of the organic capping layer 857 located on side surfaces of wire patterns 817 may be smaller than the thickness of inorganic capping patterns 837 located on the side surfaces of the wire patterns 817.

In the present embodiment, the capping layer 897 includes a first inorganic capping layer including the inorganic capping patterns 837, the organic capping layer 857 and a second inorganic capping layer 877. Since the wire patterns 817 including first wire patterns 817a and second wire patterns 817b, the first inorganic capping layer including the inorganic capping patterns 837, and the second inorganic capping layer 877 have been described above, the description thereof will be omitted. In an alternate embodiment, the second inorganic capping layer 877 may be omitted.

A void V may be defined in each space surrounded by the base BS of the polarizer 806 according to the current embodiment and the organic capping layer 857.

Although not illustrated in the drawing, the polarizer 807 according to the current embodiment can be applied in place of the polarizer 801 of the display device 1 according to the embodiment of FIG. 2 or the polarizer 802 of the display device 2 according to the embodiment of FIG. 6.

Hereinafter, the inventive concept will be described in more detail with reference to Examples and Comparative Examples. The Examples are related to the embodiments shown in FIG. 4 and FIG. 7.

Example 1

An aluminum wire grid pattern (such as wire pattern 811 of FIG. 4) was formed on a base using an imprinting method. The wire grid pattern had a pitch of about 100 nm. Then, IZO (such as the inorganic capping patterns 831 of FIG. 4) was deposited on the aluminum to a thickness of about 1,000 Å. In this case, the IZO was formed on aluminum wire patterns to have a space between adjacent IZO deposits. The distance between the IZO deposits was about 40 nm or less.

Next, an acrylic resin layer (such as the organic capping layer 851 of FIG. 4) was formed on the IZO to produce a wire grid pattern laminate. The thickness of the acrylic resin layer after curing was about 1.0 μm.

Example 2

A wire grid pattern laminate was produced by forming deposits on an aluminum wire grid pattern and forming an acrylic resin layer in the same manner as in Example 1 except that ITO was used in place of IZO. That is, the inorganic capping patterns 831 of FIG. 4 is formed using ITO instead of IZO.

Example 3

IZO deposits were formed on an aluminum wire grid pattern, and an acrylic resin layer was formed in the same manner as in Example 1.

Then, a wire grid pattern laminate was produced by depositing silicon nitride on the acrylic resin layer to a thickness of about 4,000 Å. That is, a second inorganic capping layer 872 is formed on the organic capping layer 852 as shown in FIG. 7.

Example 4

A wire grid pattern laminate was produced by forming deposits on an aluminum wire grid pattern, forming an acrylic resin layer, and then depositing silicon nitride in the same manner as in Example 3 except that ITO was used in place of IZO. That is, the inorganic capping patterns 832 of FIG. 7 is formed using ITO instead of IZO.

Example 5

A wire grid pattern laminate was produced by forming deposits on an aluminum wire grid pattern, forming an acrylic resin layer, and then depositing silicon nitride in the same manner as in Example 3 except that silicon nitride was used in place of IZO. That is, the inorganic capping patterns 832 of FIG. 7 is formed using silicon nitride instead of IZO.

Comparative Example 1

An aluminum wire grid pattern was formed on a base using an imprinting method. The wire grid pattern had a pitch of about 100 nm. Then, a wire grid pattern laminate was produced by depositing silicon nitride on the aluminum to a thickness of about 4,000 Å. In this case, the silicon nitride was formed on aluminum wire patterns to form a dense film without space.

Comparative Example 2

Silicon nitride was deposited on an aluminum wire grid pattern in the same manner as in Comparative Example 1. Then, the silicon nitride was deposited once again to a thickness of about 4,000 Å to produce a wire grid pattern laminate. Accordingly, no organic capping layer is used.

Experimental Example

The wire grid pattern laminates produced according to Examples 1 through 4 and Comparative Examples 1 and 2 were cleaned and dried. Then, ITO was deposited under vacuum conditions to simulate a common electrode formation process. Next, the remaining materials in each of the wire grid pattern laminates were evaluated, and the results are shown in Table 1 below.

TABLE 1

| | Formation of gas collecting layer | Presence of remaining liquid material |
|---|---|---|
| Example 1 | X | X |
| Example 2 | X | X |
| Example 3 | X | X |
| Example 4 | X | X |
| Example 5 | X | X |
| Comparative Example 1 | O | O |
| Comparative Example 2 | X | O |

Referring to Table 1, it can be seen that, even after a subsequent process performed under vacuum conditions, no gas collecting layer was formed, or no liquid material remained in the case of Examples 1 through 5 in which deposits spaced apart from each other were formed on an aluminum wire grid pattern layer, and an organic layer was formed on the deposits using an organic material.

On the other hand, it can be seen that a liquid material remained in a wire grid pattern, or a gas collecting layer was formed in the wire grid pattern after a subsequent process in the case of Comparative Examples 1 and 2 in which a dense film was formed on an aluminum wire grid pattern layer.

A polarizer according to an embodiment includes a capping layer including an inorganic capping layer and an organic capping layer to facilitate outgassing occurring in a process subsequent to the formation of a wire grid pattern layer and to prevent the penetration of external moisture. Therefore, the polarizer can have excellent polarization performance without defects.

That is, the capping layer of the polarizer according to the embodiment can improve the ability of the polarizer to transmit gas or vapor emitted from one side while improving the ability of the polarizer to block a liquid material introduced from the other side.

However, the effects of the embodiments are not restricted to the one set forth herein. The above and other effects of the embodiments will become more apparent to one of ordinary skill in the art to which the embodiments pertain by referencing the claims.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A polarizer comprising:
   a base;
   a wire grid pattern layer which is disposed on the base and the wire grid pattern layer comprises a plurality of wire patterns extending in a first direction and spaced apart from each other in a second direction intersecting the first direction; and
   a capping layer which is disposed on the wire grid pattern layer and comprises a first inorganic capping layer containing an inorganic material and an organic capping layer containing an organic material formed on the first inorganic capping layer,
   wherein the first inorganic capping layer comprises a plurality of inorganic capping patterns which are disposed on the wire grid pattern layer, extend in the first direction and are spaced apart from each other in the second direction, the inorganic capping patterns being disposed at positions corresponding to the wire patterns, and
   at least a portion of the organic capping layer is inserted into a space between adjacent inorganic capping patterns.

2. The polarizer of claim 1,
   wherein the wire patterns of the wire grid pattern layer have a first width in the second direction and the inorganic capping patterns have a second width in the second direction, the second width being greater than the first width.

3. The polarizer of claim 2, further comprising a second inorganic capping layer which is disposed on the organic capping layer and contains an inorganic material,
   wherein a thickness of the second inorganic capping layer is substantially uniform.

4. The polarizer of claim 1,
   wherein a distance between the adjacent inorganic capping patterns is about 15 nanometers (nm) to about 50 nm and is smaller than a distance between the wire patterns.

5. The polarizer of claim 4, wherein a thickness of the inorganic capping patterns is about 800 Å to about 1,500 Å.

6. The polarizer of claim 1, wherein the inorganic capping patterns are partially in contact with side surfaces of the wire patterns.

7. The polarizer of claim 6, wherein the inorganic capping patterns are partially in contact with the base.

8. The polarizer of claim 1,
   wherein the inorganic capping patterns are in contact with upper surfaces of the wire patterns, and
   the organic capping layer is in contact with upper surfaces of the inorganic capping patterns.

9. The polarizer of claim 8, wherein the organic capping layer is partially in contact with side surfaces of the inorganic capping patterns.

10. The polarizer of claim 1, wherein at least a portion of the organic capping layer is inserted into a space between adjacent wire patterns.

11. The polarizer of claim 10, wherein the organic capping layer is partially in contact with the base.

12. The polarizer of claim 1, wherein the wire patterns comprise,
    first wire patterns which contain a metallic material, and
    second wire patterns which are disposed between the first wire patterns and the inorganic capping patterns and contain a non-metallic inorganic material,
    wherein a width of the first wire patterns is greater than or equal to a width of the second wire patterns.

13. The polarizer of claim 12, wherein a thickness of the first wire patterns is greater than that of the second wire patterns.

14. The polarizer of claim 12, wherein the inorganic capping patterns are partially in contact with side surfaces of the first wire patterns and side surfaces of the second wire patterns.

15. The polarizer of claim 1, wherein a void is defined in a space surrounded by the base, adjacent wire patterns, and the inserted organic capping layer.

16. A polarizer comprising:
    a base;
    a wire grid pattern layer which is disposed on the base and the wire grid pattern layer comprises a plurality of wire patterns extending in a first direction and spaced apart from each other in a second direction intersecting the first direction; and
    a capping layer which is disposed on the wire grid pattern layer and comprises a first portion containing an inorganic material and a second portion containing an organic material,
    wherein the first portion and the second portion are arranged alternately along the second direction.

17. The polarizer of claim 16,
    wherein the first portions are disposed at positions corresponding to the wire patterns, and
    the second portions are disposed at positions corresponding to spaces between adjacent wire patterns.

18. The polarizer of claim 17, wherein a width of the first portions in the second direction is greater than that of the second portions in the second direction.

19. A display device comprising:
a first panel which comprises a polarizer;
a second panel which faces the first panel; and
a liquid crystal layer which is interposed between the first panel and the second panel,
wherein the polarizer comprises:
a wire grid pattern layer which comprises a plurality of wire patterns extending in a first direction and spaced apart from each other in a second direction intersecting the first direction;
an inorganic capping layer which is disposed on the wire grid pattern layer and comprises a plurality of inorganic capping patterns extending in the first direction and spaced apart from each other in the second direction, the inorganic capping patterns being disposed at positions corresponding to the wire patterns; and
an organic capping layer which is disposed on the inorganic capping layer,
wherein at least a portion of the organic capping layer is inserted into a space between adjacent inorganic capping patterns.

20. The display device of claim 19,
wherein the first panel comprises,
a first base substrate,
a color conversion pattern layer which is disposed on a surface of the first base substrate,
an inorganic protective layer which is disposed on the color conversion pattern layer and contains an inorganic material,
the wire grid pattern layer which is disposed on the inorganic protective layer,
the inorganic capping layer which is disposed on the wire grid pattern layer and made of a different material from the inorganic protective layer,
the organic capping layer which is disposed on the inorganic capping layer, and
a common electrode which is disposed on the organic capping layer, and
the second panel comprises,
a second base substrate,
a switching element which is disposed on a surface of the second base substrate, and
a pixel electrode which is disposed on the switching element.

* * * * *